(12) United States Patent
Lau (10) Patent No.: US 7,198,310 B1
(45) Date of Patent: Apr. 3, 2007

(54) DEVICE FOR PET ANIMAL DROPPINGS COLLECTION

(76) Inventor: Ho Yin Lau, 25E, Tung Hoi Mansion, Taikoo Shing, Quarry Bay (HK)

( * ) Notice: Subject to any disclaimer, the term of this patent is extended or adjusted under 35 U.S.C. 154(b) by 0 days.

(21) Appl. No.: 11/327,440

(22) Filed: Jan. 9, 2006

(51) Int. Cl.
*A01K 29/00* (2006.01)

(52) U.S. Cl. ..................................... 294/1.5

(58) Field of Classification Search .......... 294/1.3–1.5; 15/257.1, 257.6
See application file for complete search history.

(56) References Cited

U.S. PATENT DOCUMENTS

| | | | |
|---|---|---|---|
| 4,097,082 A * | 6/1978 | Orofino | 294/1.4 |
| 4,210,351 A * | 7/1980 | Orofino | 294/1.5 |
| 4,226,169 A | 10/1980 | Mazur et al. | |
| 4,335,678 A * | 6/1982 | Garza et al. | 294/1.5 |
| 4,878,703 A | 11/1989 | Yoshioka | |
| 5,350,208 A * | 9/1994 | Heinrichson | 294/1.4 |
| 6,062,618 A * | 5/2000 | Figueroa | 294/1.4 |

FOREIGN PATENT DOCUMENTS

| | | |
|---|---|---|
| JP | 92245518 | 9/1997 |
| JP | 2000333548 | 12/2000 |

* cited by examiner

*Primary Examiner*—Dean J. Kramer
(74) *Attorney, Agent, or Firm*—Rabin & Berdo, P.C.

(57) ABSTRACT

A device for pet animal droppings collection, including a hollow pole; a control lever, the control lever being placed inside the hollow pole and extending from one end of the hollow pole to the other end; an operating mechanism, the operating mechanism being installed on a fixing panel and fixed at one end of the hollow pole through the fixing panel, from which end the control lever extends from and is connected to the operating mechanism, and a spring being provided to cross-connect between the end of the control lever and the fixing panel, wherein the operating mechanism is composed of a movable assembly and a collection bag supporting assembly; and a droppings collection bag, the collection bag being disposed in a mountable and dismountable way on the operating mechanism.

12 Claims, 7 Drawing Sheets

DEVICE FOR PET ANIMAL DROPPINGS COLLECTION

FIELD OF THE INVENTION

The present invention relates to a pet animal utensil, particularly to a device for pet animal droppings collection, more particularly to a device for pet dog droppings collection.

BACKGROUND OF THE INVENTION

Presently, there is an increasing number of domestic pet animals with years. People are fond of carrying pet animals going for a stroll. However, the accompanying problem is that the pet animals leave over their droppings in public spaces such as streets, gardens, and lawns. Pet animals relieve or discharge themselves everywhere not only causing serious environmental sanitation problem, but also badly affecting people who walk around if the droppings are not timely removed out.

For environmental sanitation sake, pet animal raisers have the responsibility to timely remove their pet animal droppings. Currently, the primary method for collecting pet animal droppings is placing waste paper or plastic bag by hands underneath a pet animal, then wrapping the droppings and throwing into a garbage can. Handling pet animal droppings in such a way is both not good for hygiene and inconvenient.

Japan Patent JP2000333584 discloses a handling means for dog excreta. Operating such handling means comprises pulling up and down a web. The primary shortcomings are inconvenient in operation and not good-looking.

Japan Patent JP9224518 teaches another kind of means for dog droppings collection. The problems of this kind of means are that the distance between the point of support and the point of action in the open-close mechanism is too small, leading to an uneasy open-close operation for the open-close mechanism and that the loading arm is movable, so that the plastic bag opening not always is able to be normally opened.

U.S. Pat. No. 4,878,703 discloses a means for pet animal droppings handling. Said means needs additional executing mechanism for automatically opening-closing a droppings collection bag. Therefore, it is relatively complicated in both of its construction and mechanical design.

U.S. Pat. No. 4,225,169 relates to another kind of means for pet animal droppings collection. Said means comprises an umbrella-like manipulator. When it is required to collect droppings, which fell onto ground by pet animals, the manipulator in the closing state is encased with a collection bag, then the manipulator is opened to pick up the droppings and put them directly in the collection bag, which has already been encased on the manipulator. Such a design allows the avoidance of handling the droppings directly by hands, but the pet animal droppings have already dirtied the public places.

Although the droppings collection means disclosed in the above-mentioned patents have performed their individual goals, they still have the problems of complicated structure and uneasy operation, or they are merely used for collecting the excreta, which are already on ground with the disadvantage of environmental sanitation. Therefore, there is a need to provide to pet animal raisers a more convenient and more hygienic device for pet animal droppings collection.

SUMMARY OF THE INVENTION

The present invention overcomes the shortcomings of the prior art and provides a device for pet animal droppings collection, which is simple in structure, convenient to handle, easy to carry, capable of reducing pollution and maintaining environmental sanitation. Said device solves the drawbacks of the prior art such as being inconvenient and unhygienic in pet animal droppings collection and provides to pet animal raisers an ideal means for droppings collection.

The object of the present invention is accomplished by providing a device for pet animal droppings collection, comprising:

a hollow pole;

a control lever, said control lever being placed in said hollow pole and extending from one end of the hollow pole to the other end;

an operating mechanism, said operating mechanism being installed on a fixing panel and fixed through said fixing panel at one end of said hollow pole, from which end said control lever extends from and is connected to said operating mechanism, and a spring being provided to cross-connect between the end of the control lever and said fixing panel, wherein said operating mechanism is composed of a movable assembly and a collection bag supporting assembly, said movable assembly comprises a pair of L-shaped actively movable parts and a pair of I-shaped follow-up movable parts, said two pairs of the movable parts being respectively fixed on said fixing panel in a rotatable way, while one end of said L-shaped actively movable parts being connected with said control lever in a rotatable way, and said collection bag supporting assembly comprises a pair of symmetrically arranged L-shaped supporting parts, two long end portions of said L-shaped supporting parts being used for mounting the collection bag, while two short end portions being rotatable connected with two pairs of the movable parts, respectively; and a droppings collection bag, said collection bag being disposed in a mountable and dismountable way on said operating mechanism.

In the above-mentioned device for pet animal droppings collection, said hollow pole has a handle at one end, there is provided a through hole on a connection part of said handle with the hollow pole, said through hole is communicated with the hollow part of said hollow pole from which extends said control lever. A button is connected at the terminal of the control lever extending from said hole, for opening and closing said operating mechanism.

In order to facilitate users to stand by their pet animals holding said collection device, a curve portion is set on said connection part, preferably with a curvature of 130°.

In order to facilitate the users to stand by their pet animals holding said collection device, a curve portion is set on said connection part, preferably with a curvature of 130°.

In the above-mentioned pet animal droppings collection device, there is a slot set in the middle or central portion of said fixing panel for guiding said control lever in up and down movements.

In the above-mentioned pet animal droppings collection device, in non-forced case said spring keeps the operating mechanism in a closing state.

As a preferred embodiment of the present invention, said operating mechanism is composed of a movable assembly and a collection bag supporting assembly, wherein said movable assembly comprises a pair of L-shaped actively movable parts arranged in an opposite way and a pair of I-shaped follow-up movable parts. Said two pairs of the movable parts are, respectively, fixed on said fixing panel in a rotatable way, while one end of said L-shaped actively movable parts is connected with said control lever in a rotatable way. Said collection bag supporting assembly is comprised of one pair of symmetrically arranged L-shaped supporting parts, wherein the two long end portions of said L-shaped supporting parts are used for mounting the collection bag, while the two short end portions are rotatably connected with two pairs of the movable parts, respectively.

In order to easily mount and dismount the droppings collection bag, the oppositely arranged ends of the long end portions of said L-shaped supporting parts are fork-shaped.

The present invention employs a disposable droppings collection bag, which is designed for easily mounting on and dismounting from said operating mechanism. There is a hollow cavity on the opposite two sides of the bag opening for inserting in said operating mechanism, guiding the insertion of said L-shaped long end portions. In addition, there is a rope around the bag opening for fixing the collection bag on said operating mechanism.

The present invention possesses the advantages of simplicity in the structure, easiness for use and carrying about, being capable of timely collecting the droppings excreted by pet animals then sealing the bag opening and discarding. Such a design allows maintenance of environmental sanitation and avoiding the potential droppings pollution to human being.

The present invention will be further described in conjunction with the description of a preferred embodiment with reference to the drawings.

DETAILED DESCRIPTION OF THE INVENTION

Figure 1:
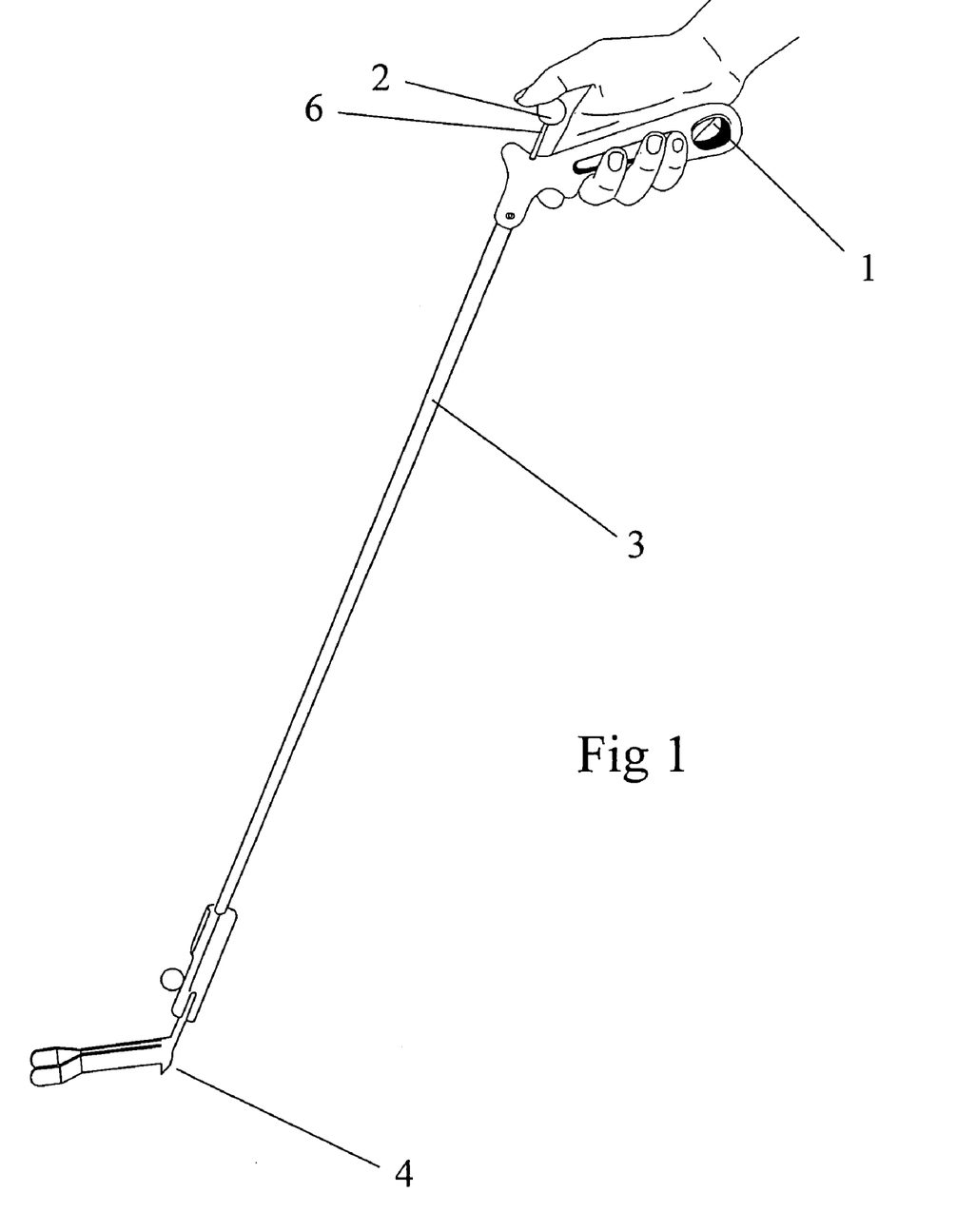
FIG. 1 is a perspective view of a device for pet animal droppings collection according to a preferred embodiment of the present invention in a closing state.
Figure 2:
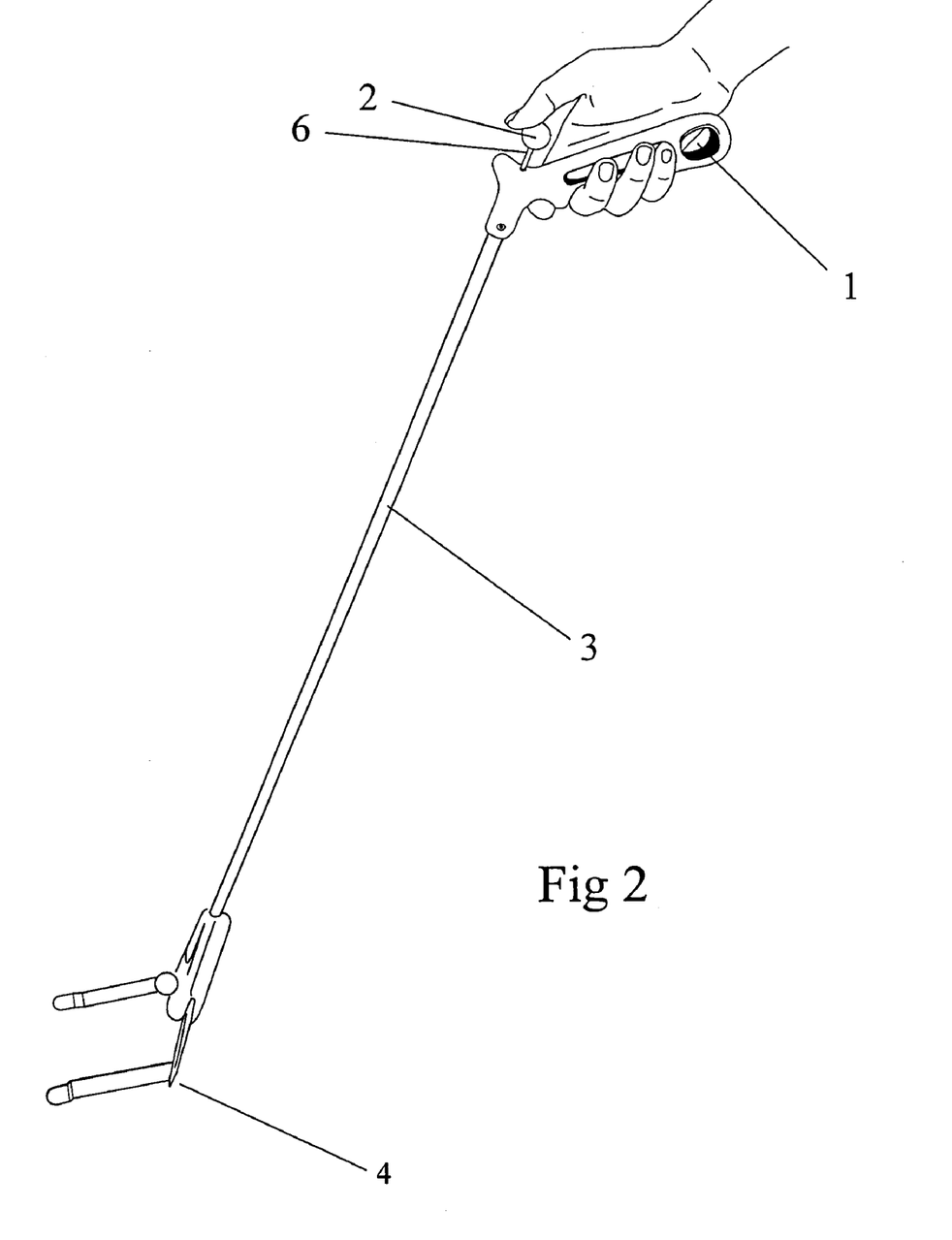
FIG. 2 is a perspective view of the device for pet animal droppings collection shown in FIG. 1 in an opening state.
Figure 3:
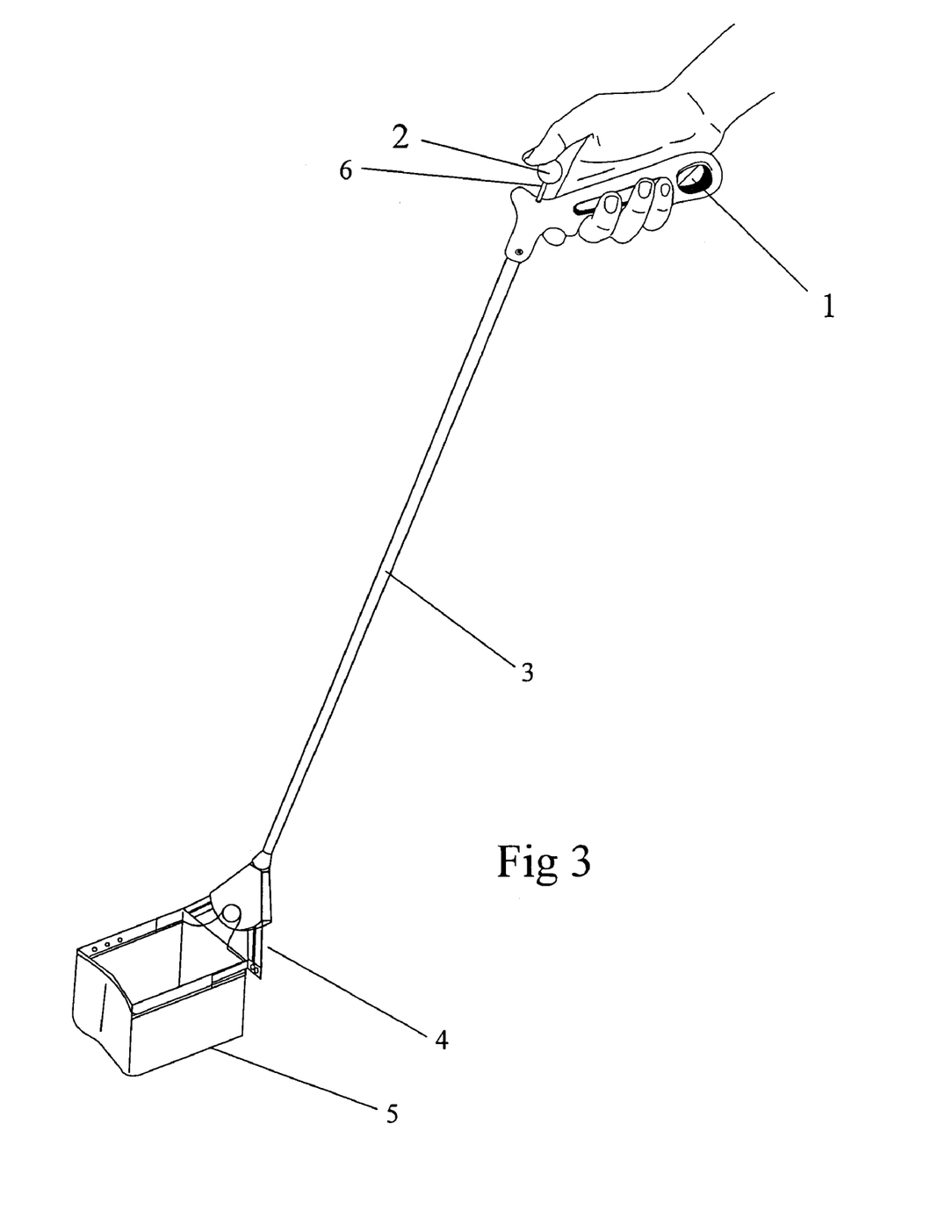
FIG. 3 is a perspective view of the device for pet animal droppings collection shown in FIG. 1 with the droppings collection bag in an opening state.
Figure 4:
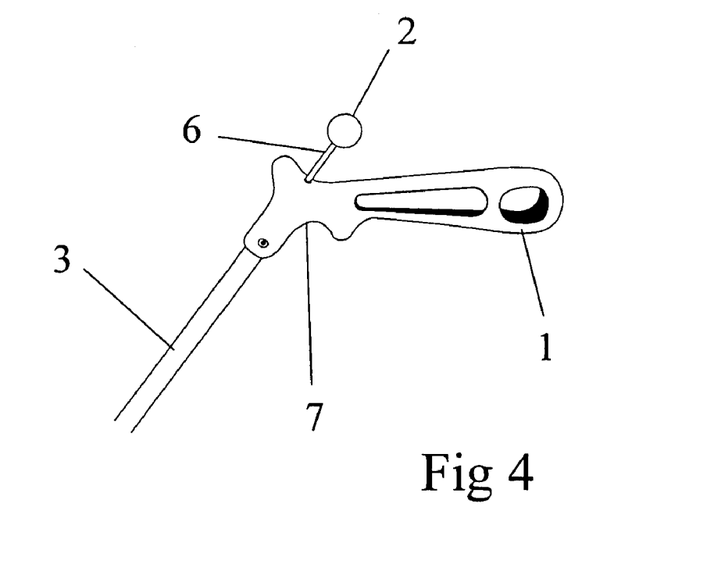
FIG. 4 is a front-view of the connection of the hollow pole with the handle in the device for pet animal droppings collection shown in FIG. 1.

Referring to FIG. 1 and FIG. 2, there is shown a device for pet animal droppings collection of the present invention as a preferred embodiment, comprising a long and thin hollow pole 3 which is connected at its upper end with a handle 1 and at its lower end with a fixing panel 9, and in which a metal lever 6 is placed. There is a curve portion 7 of about 130° at a connection site of the handle 1 with the hollow pole 3, on which is provided a hole in communication with the hollow portion of hollow pole 3, as shown in FIG. 4. Said metal lever 6 passes through said hole and has its upper end extending out to connect with a button 2, its lower end extending out to connect with an operating mechanism 4. FIG. 3 shows a perspective view, which illustrates a droppings collection bag 5 mounted onto said operating mechanism 4. The hollow pole 3 has a length in the range of about 0.6 m to 0.9 m, allowing the user to place the droppings collection bag 5 at the rear of the pet animal without bending his/her body.

As shown in FIG. 4, a curve portion 7 is arranged on the connection site of the handle 1 and the hollow pole 3 with a curvature of about 130°, which facilitates the user to stand by the pet animal holding said collection device. When said handle 1 is held in hand, the button 2 at the upper end of the metal lever 6 is under control by fingers of the user who may push down the button 2 to open the droppings collection bag 5 to let the pet animal eject its droppings directly into the collection bag 5.

Figure 5:
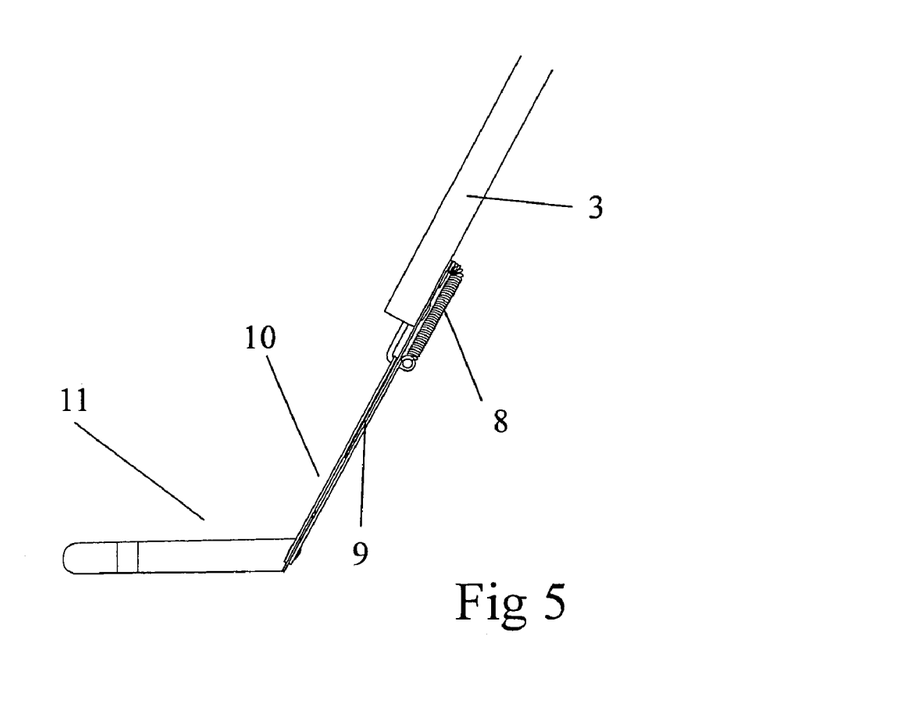
FIG. 5 is a side-view of the operating mechanism in the device for pet animal droppings collection shown in FIG. 1.
Figure 6:
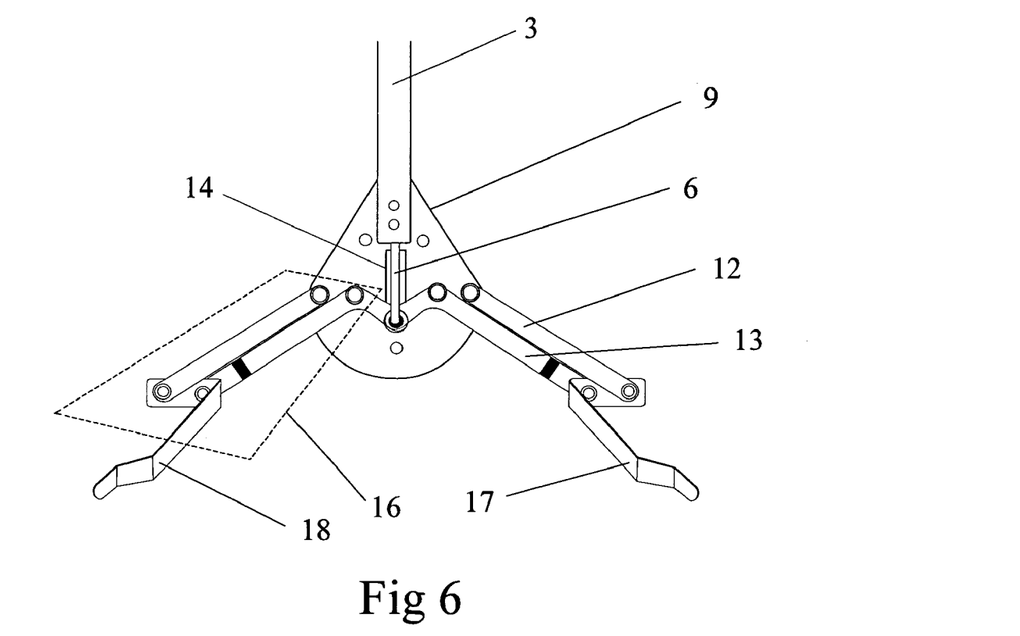
FIG. 6 is a front-view of the operating mechanism in an opening sate in the device for pet animal droppings collection shown in FIG. 1.
Figure 7:
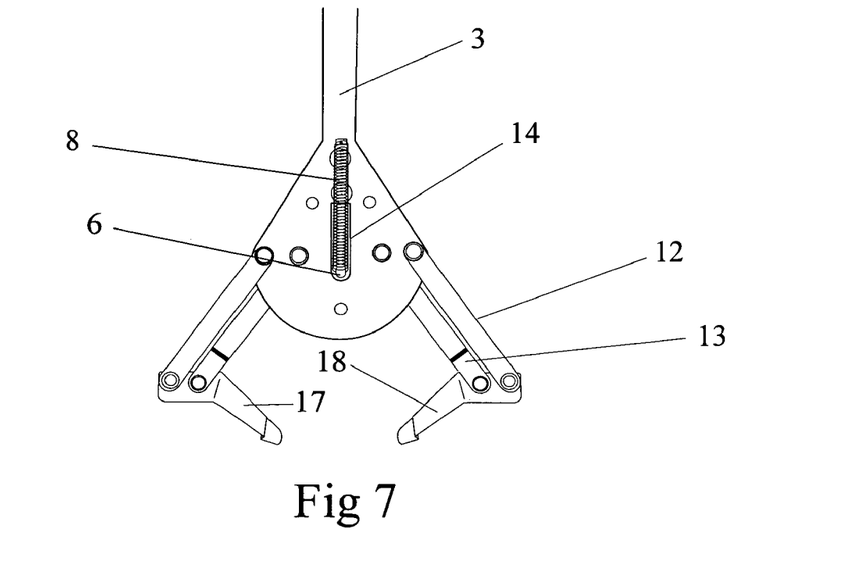
FIG. 7 is a rear-view of the operating mechanism in an opening sate in the device for pet animal droppings collection shown in FIG. 1.
Figure 8:
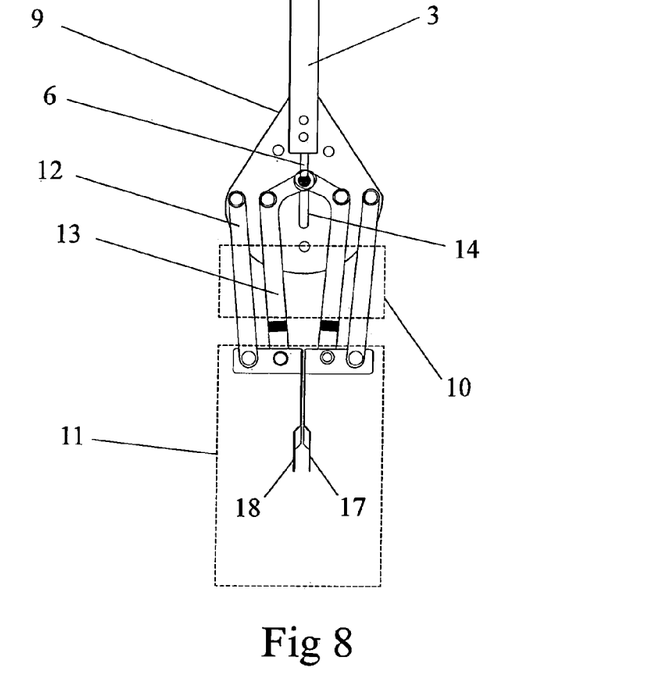
FIG. 8 is a front-view of the operating mechanism in a closing sate in the device for pet animal droppings collection shown in FIG. 1.
Figure 9:
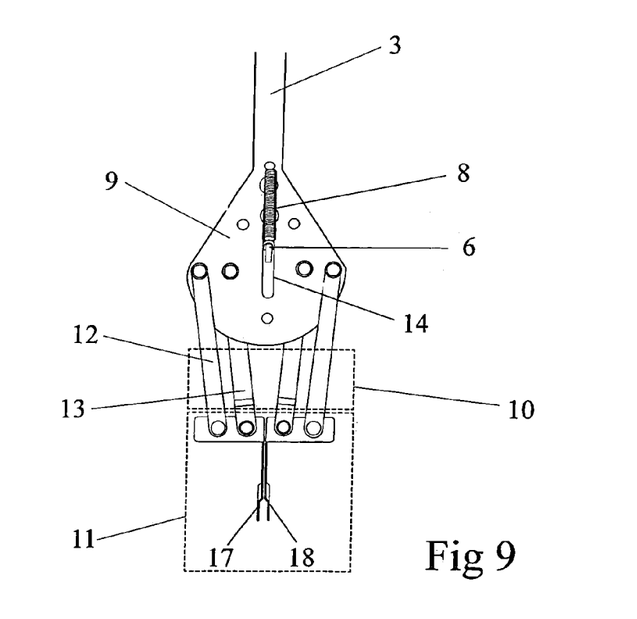
FIG. 9 is a rear-view of the operating mechanism in a closing sate in the device for pet animal droppings collection shown in FIG. 1.

FIG. 5 shows the connection relationship between the operating mechanism 4 and the metal lever 6 of said device for pet animal droppings collection. It can be clearly seen that said operating mechanism 4 is composed of a movable assembly 10 and a collection bag supporting assembly 11, the metal lever 6 extends out of the hollow pole 3 to connect to the movable assembly 10 mounted on the fixing panel 9. Thus, through said fixing panel 9, said operating mechanism 4 is fixed on the lower end of the hollow pole 3, between which end and said operating mechanism 4 a spring 8 is cross-connected. Under the action of said spring 8, said operating mechanism 4 is kept in a closing state. When the spring 8 is forced, said operating mechanism 4 is driven to be opened.

Now referring to FIG. 6 to FIG. 9, they are, respectively, the front-views and the rear-views of said operating mechanism 4 in the opening state and in the closing state. It can be seen from these views that there is provided a slot 14 in the middle or the central position of the fixing panel 9, which guides the metal lever 6 to move up and down upon opening and closing said operating mechanism. As above-mentioned, said operating mechanism 4 is composed of the movable assembly 10 and the collection bag supporting assembly 11.

Said movable assembly 10 comprises a pair of L-shaped actively movable parts 13 and a pair of I-shaped follow-up movable parts 12. Said two pairs of the movable parts 12 and 13 are, respectively, fixed on said fixing panel 9 in a rotatable way, while one end of said L-shaped actively movable parts 13 is connected with said metal lever 6 in a rotatable way. Preferably, said one pair of I-shaped follow-up movable parts 12 comprises individually two metal panels, said two metal panels are, respectively, secured to both sides of said fixing panel 9 at the same position to increase the strength of the operating mechanism 4.

Said collection bag supporting assembly 11 is comprised of one pair of symmetrically arranged L-shaped supporting parts 17 and 18, wherein two long end portions of said L-shaped supporting parts 17 and 18 are used for mounting the collection bag, said parts 17 and 18 being kept closely together when the pet animal droppings collection device is in closing state, while two short end portions are rotatably connected with two pairs of the movable parts 12 and 13, respectively, and take an arc movement with said two pairs movable parts 12 and 13. Said L-shaped supporting parts 17 and 18 make an angle of about 120° with said hollow pole to allow the user to easily stand by the pet animal placing the droppings collection bag 5 at the rear of the pet animal. In order to easily mount and dismount the droppings collection bag 5, the oppositely arranged ends of the long end portions of L-shaped supporting parts 17 and 18 are fork-shaped.

As one end of said movable assembly 10 is fixed on the fixing panel 9 and the other end is connected to the collection bag supporting assembly 11, on each side of the metal lever 6 there forms a parallelogram 16. By controlling the button 2, the metal lever 6 is moved up and down so as to drive the two parallelograms 16 to open or close, thereby the droppings collection bag 5 can be easily mounted and dismounted and its bag opening can be easily opened.

Figure 10:
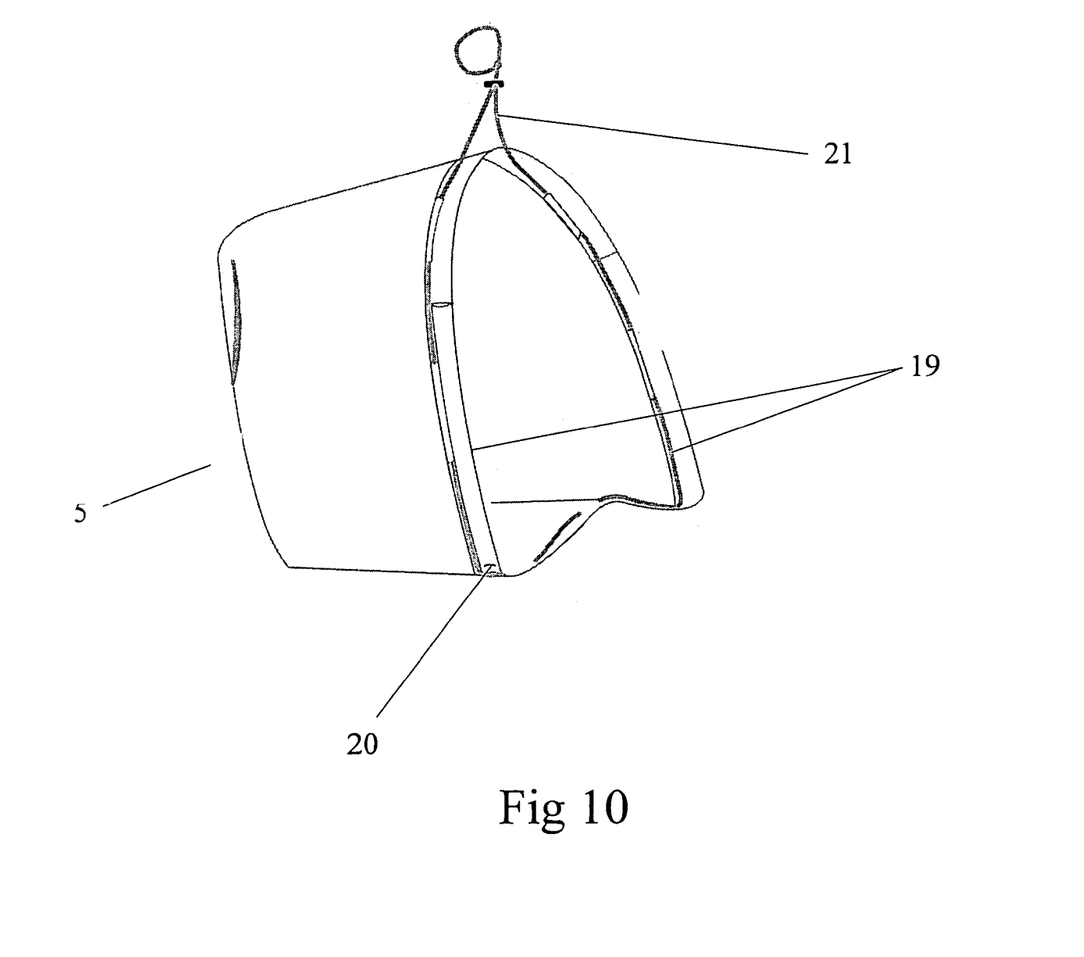
FIG. 10 is a perspective view of a kind of mountable and dismountable droppings collection bag used for the pet animal droppings collection device according to the present invention.

FIG. 10 shows a droppings collection bag 5 employed by the present invention, which may be made of plastic materials or degradable materials for disposable use.

There is a hollow cavity 19 on the opposite two sides of the bag opening respectively, said L-shaped supporting parts 17 and 18 are inserted in via an entry 20 of said hollow cavity 19, making the collection bag 5 to be firmly mounted on the operating mechanism 4. In order to more easily mount the droppings collection bag 5, a tough or hard inner lining may be placed in the hollow cavity 19 of said collection bag 5. In addition, there is a rope 21 around the bag opening of the droppings collection bag 5, which in one hand is used for fixing said collection bag 5, and in the other hand, is used for tying the bag opening after pet animal droppings are collected, and then the bag 5 is thrown into a garbage can or box.

When not in use, under the tension action of the spring 8 set between the lower end of the hollow pole 3 and the operating mechanism 4, the operating mechanism 4 is closed up, the pet animal droppings collection device of the present invention is returned to its closing state (shown in FIG. 1), making it easy to carry about.

When the user finds his/her pet animal has a call of nature, he/she just simply mounts the droppings collection bag 5 carried with the user via its entry 20 of the bag opening onto the two L-shaped supporting parts 17 and 18 of the operating mechanism 4. The user then holds the handle 1 and slightly pushes down the button 2 to make the metal lever 6 placed inside the hollow pole 3 to move downward along the slot 14 of the fixing panel 9. Such a downward movement of the metal lever 6 allows the movable assembly 10 to force the spring 8 to drive the movable assembly 10 which, in turn, drives the collection bag supporting assembly 11 to move in opposite direction to thereby open up the droppings collection bag 5. At this point, the user can place the droppings collection bag 5 at the rear of the pet animal to receive the droppings ejected by the pet animal. After that, the user moves his/her fingers away from the button 2 to let the spring 8 restore and draw back the movable assembly 10, which makes the collection bag supporting assembly 11 closing up, followed by the closing up of the droppings collection bag 5. Finally, the user can dismount the droppings collection bag 5, tie up the bag opening with the rope 21, and discard the bag into a garbage can.

The device for pet animal droppings collection of the present invention is very handy, easy to operate. It is unfolded when in use, while it is folded when not in use. Therefore, it is convenient to carry about. In addition, the collection device according to the invention has a simple design in the mechanical movement and the mechanical power, without the need of any additional or complex mechanism, which therefore reduces the production cost.

Although the present invention has been illustrated by one preferred embodiment in combination of the drawings, it is understood for the skilled artisans of the art that a number of modifications and variations can be made without going beyond the spirit and scope, for example, the operating mechanism of the pet animal droppings collection device can take other shapes, all these modifications and variations are within the protective scope which are claimed by the present invention.

What is claimed is:

1. A device for pet animal droppings collection, comprising:

a hollow pole;

a control lever, said control lever being placed inside said hollow pole and extending from one end of the hollow pole to the other end;

an operating mechanism, said operating mechanism being installed on a fixing panel and fixed at one end of said hollow pole through said fixing panel, from which end said control lever extends from and is connected to said operating mechanism, and a spring being provided to cross-connect between the end of the control lever and said fixing panel, wherein said operating mechanism is composed of a movable assembly and a collection bag supporting assembly, said movable assembly comprises a pair of L-shaped actively movable parts and a pair of I-shaped follow-up movable parts, said two pairs of the movable parts being respectively fixed on said fixing panel in a rotatable way, while one end of said L-shaped actively movable parts being connected with said control lever in a rotatable way, and said collection bag supporting assembly comprises a pair of symmetrically arranged L-shaped supporting parts, two long end portions of said L-shaped supporting parts being used for mounting the collection bag, while two short end portions being rotatable connected with two pairs of the movable parts, respectively; and a droppings collection bag, said collection bag being disposed in a mountable and dismountable way on said operating mechanism.

2. The device for pet animal droppings collection according to claim 1, characterized in that said hollow pole has a handle at one end, there is provided a through hole in a connection part of said handle with the hollow pole, said through hole is communicated with the hollow part of said hollow pole from which extends said control lever.

3. The device for pet animal droppings collection according to claim 2, characterized in that there is a curve portion at said connection part.

4. The device for pet animal droppings collection according to claim 3, characterized in that said curve portion has a curvature of about 130°.

5. The device for pet animal droppings collection according to claim 2, characterized in that the end of the control lever, extends from said through hole, is connected to a button, which is used for opening and closing said operating mechanism.

6. The device for pet animal droppings collection according to claim 1, characterized in that said control lever is a metal lever.

7. The device for pet animal droppings collection according to claim 1, characterized in that a slot is set in the central portion of said fixing panel for guiding said control lever in up and down movements.

8. The device for pet animal droppings collection according to claim 1, characterized in that said spring in non-forced state keeps said operating mechanism in a closing state.

9. The device for pet animal droppings collection according to claim 1, characterized in that said one pair of I-shaped follow-up movable parts individually comprises two flat panels, said two flat panels are fixed on the both sides of said fixing panel, respectively.

10. The device for pet animal droppings collection according to claim 1, characterized in that in order to easily mount the droppings collection bag, the oppositely arranged ends of the long end portions of said L-shaped supporting parts are splayed apart to ease entry of the droppings collection bag.

11. The device for pet animal droppings collection according to claim 1, characterized in that said L-shaped long end portion makes an angle of about 120° with said hollow pole.

12. The device for pet animal droppings collection according to claim 1, characterized in that there is provided a hollow cavity on opposite two sides of the bag opening of the droppings collection bag respectively, which cavities allows said L-shaped supporting parts to insert in; there is a rope around the bag opening of said droppings collection bag, which is used for fixing said collection bag on said operating mechanism.

* * * * *